United States Patent
Stephan et al.

(12) 
(10) Patent No.: US 12,139,905 B2
(45) Date of Patent: *Nov. 12, 2024

(54) ONE-PIECE BONDING SPLICE FOR RAILS

(71) Applicant: PEGASUS SOLAR, INC., Richmond, CA (US)

(72) Inventors: Erich Kai Stephan, Richmond, CA (US); Glenn Harris, Richmond, CA (US); Peter Wilke, Richmond, CA (US); Nicholas Wenzel, Richmond, CA (US); James Hsieh, Richmond, CA (US)

(73) Assignee: PEGASUS SOLAR, INC., Richmond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,814

(22) Filed: Feb. 14, 2023

(65) Prior Publication Data
US 2023/0287674 A1 Sep. 14, 2023

Related U.S. Application Data

(63) Continuation of application No. 17/834,774, filed on Jun. 7, 2022, now Pat. No. 11,608,627, which is a (Continued)

(51) Int. Cl.
*E04B 1/24* (2006.01)
*E04C 3/07* (2006.01)
*E04C 3/04* (2006.01)

(52) U.S. Cl.
CPC .............. *E04B 1/2403* (2013.01); *E04C 3/07* (2013.01); *E04B 2001/2415* (2013.01);
(Continued)

(58) Field of Classification Search
CPC .......... E04B 1/2403; E04B 2001/2457; E04B 2001/2415; E04B 2001/2433;
(Continued)

(56) References Cited

U.S. PATENT DOCUMENTS

| 2,394,729 A | 8/1944 | Tinnerman |
| 2,712,917 A | 3/1951 | Flora et al. |

(Continued)

FOREIGN PATENT DOCUMENTS

| AU | 2020287090 | 11/2021 |
| AU | 2020336321 | 2/2022 |

(Continued)

OTHER PUBLICATIONS

International Search Report and Written Opinion from the International Searching Authority, mailed Mar. 30, 2021, 11 pages, for corresponding International Patent Application No. PCT/US2020/062406.

(Continued)

*Primary Examiner* — Jessie T Fonseca
(74) *Attorney, Agent, or Firm* — Polsinelli LLP

(57) ABSTRACT

A splice having a main body and one or more protrusions extending from the main body. The one or more protrusions can be operable to interfere with a rail when the main body is installed into an opening of the rail. The one or more protrusions may be operable to cut into a coating of the rail and form an electrical connection between the rail and the main body.

20 Claims, 13 Drawing Sheets

Related U.S. Application Data continuation of application No. 17/103,682, filed on Nov. 24, 2020, now Pat. No. 11,377,840.

(60) Provisional application No. 62/940,771, filed on Nov. 26, 2019.

(52) U.S. Cl.
CPC ............... *E04B 2001/2433* (2013.01); *E04B 2001/2448* (2013.01); *E04B 2001/2457* (2013.01); *E04C 2003/0417* (2013.01); *E04C 2003/0439* (2013.01); *E04C 2003/0473* (2013.01)

(58) Field of Classification Search
CPC ............... E04B 2001/2448; E04C 3/07; E04C 2003/0417; E04C 2003/0439; E04C 2003/0473; H02S 20/00; H01R 25/162; F24S 25/65; Y02E 10/47; Y02E 10/50
See application file for complete search history.

(56) References Cited

U.S. PATENT DOCUMENTS

| | | |
|---|---|---|
| 3,066,900 A | 12/1962 | Holton |
| 3,122,604 A | 2/1964 | Cook et al. |
| 3,145,753 A | 8/1964 | Kreider |
| 3,966,342 A | 6/1976 | Moriya |
| 4,159,758 A | 7/1979 | Courson |
| 4,269,043 A | 5/1981 | Kizu |
| 4,285,379 A | 8/1981 | Kowalski |
| 4,570,408 A | 2/1986 | Frascaroli |
| 4,729,706 A | 3/1988 | Peterson et al. |
| 4,897,005 A | 1/1990 | Peterson et al. |
| 4,907,388 A | 3/1990 | Siahatgar |
| 4,950,841 A | 8/1990 | Walker |
| 5,144,780 A | 9/1992 | Gieling |
| 5,203,135 A | 4/1993 | Bastian |
| D353,209 S | 12/1994 | Dallaire et al. |
| 5,423,646 A | 6/1995 | Gagnon |
| 5,489,173 A | 2/1996 | Hofle |
| 5,596,237 A | 1/1997 | Daniels |
| 5,657,604 A | 8/1997 | Malott |
| 5,713,707 A | 2/1998 | Gagnon |
| 6,032,939 A | 3/2000 | Chen |
| 6,086,300 A | 7/2000 | Frohlich |
| 6,205,719 B1 | 3/2001 | Bruce |
| 6,568,873 B1 | 5/2003 | Peterson |
| 6,874,971 B2 | 4/2005 | Albaugh |
| 7,077,855 B2 | 7/2006 | Curtis |
| 7,568,855 B2 | 8/2009 | Fitzler et al. |
| 7,832,180 B2 | 11/2010 | Dolby |
| 7,866,098 B2 | 1/2011 | Cinnamon |
| 7,878,745 B2 | 2/2011 | Allen et al. |
| 8,070,119 B2 | 12/2011 | Taylor |
| 8,181,926 B2 | 5/2012 | Magno et al. |
| 8,375,661 B1 | 2/2013 | diGirolamo et al. |
| 8,387,319 B1 | 3/2013 | Gilles-Gagnon et al. |
| 8,567,030 B2 | 10/2013 | Koch et al. |
| 8,656,658 B2 | 2/2014 | Shufflebotham |
| 8,695,290 B1 | 4/2014 | Kim et al. |
| 8,893,445 B2 | 11/2014 | Yen |
| 8,919,075 B2 | 12/2014 | Erickson |
| 8,935,893 B2 | 1/2015 | Liu et al. |
| 8,938,932 B1 | 1/2015 | Wentworth et al. |
| D732,698 S | 6/2015 | Meng |
| 9,121,433 B1 | 9/2015 | Bacon |
| 9,181,705 B2 | 11/2015 | Lanza |
| 9,249,813 B2 | 2/2016 | Kalman |
| 9,267,529 B2 | 2/2016 | Tejero Salinero |
| 9,350,288 B2 | 5/2016 | Hardikar |
| 9,447,988 B2 | 9/2016 | Stearns et al. |
| 9,473,066 B2 | 10/2016 | Stephan et al. |
| 9,531,319 B2 | 12/2016 | Braunstein et al. |
| 9,590,405 B1 | 3/2017 | Maurer |
| 9,590,406 B1 | 3/2017 | Maurer |
| 9,705,299 B1 | 3/2017 | Maurer et al. |
| 9,660,570 B2 | 5/2017 | Stephan |
| 9,689,411 B2 | 6/2017 | Meine et al. |
| 9,819,303 B2 | 11/2017 | Ash |
| 9,837,954 B2 | 12/2017 | Ash |
| 9,893,677 B1 | 2/2018 | Liu |
| 10,097,133 B2 | 10/2018 | Aliabadi et al. |
| 10,205,418 B2 | 2/2019 | Nayar |
| 10,211,775 B1 | 2/2019 | Wentworth et al. |
| 10,218,305 B1 | 2/2019 | Schrock |
| 10,270,383 B2 | 4/2019 | Wildes et al. |
| 10,288,319 B2 | 5/2019 | Li et al. |
| 10,305,415 B2 | 5/2019 | McPheeters et al. |
| 10,472,828 B2 | 11/2019 | Stearns et al. |
| 10,749,459 B1 | 8/2020 | Liu et al. |
| 10,847,960 B1 | 11/2020 | Naugler et al. |
| 10,914,513 B1 | 2/2021 | Dhage et al. |
| 11,143,436 B1 | 10/2021 | Stephan et al. |
| 11,258,397 B2 | 2/2022 | Von Deylen |
| 11,296,648 B1 | 4/2022 | Jasmin et al. |
| 11,313,591 B1 | 4/2022 | Atia |
| 11,336,222 B1 | 5/2022 | Garza et al. |
| 11,463,040 B2 | 10/2022 | Affentranger, Jr. |
| 11,486,434 B2 | 11/2022 | Kovacs et al. |
| 11,757,400 B1 | 9/2023 | Jasmin et al. |
| D1,004,141 S | 11/2023 | Stephan et al. |
| 11,811,358 B2 | 11/2023 | Von Deylen |
| 11,990,862 B2 | 5/2024 | Stephan et al. |
| 2003/0177706 A1 | 9/2003 | Ullman |
| 2007/0248434 A1 | 10/2007 | Wiley et al. |
| 2008/0310913 A1 | 12/2008 | Urban et al. |
| 2009/0003961 A1 | 1/2009 | Padfield et al. |
| 2009/0114269 A1 | 5/2009 | Fletcher et al. |
| 2010/0202853 A1 | 8/2010 | Merhar et al. |
| 2010/0281793 A1 | 11/2010 | McPheeters et al. |
| 2011/0001030 A1 | 1/2011 | Hochreiter et al. |
| 2011/0194886 A1 | 8/2011 | Wu |
| 2011/0240101 A1 | 10/2011 | Sagayama et al. |
| 2011/0253859 A1 | 10/2011 | Ostermeier et al. |
| 2012/0097207 A1 | 4/2012 | Shufflebotham et al. |
| 2012/0325761 A1 | 12/2012 | Kübsch et al. |
| 2013/0008490 A1 | 1/2013 | Rego et al. |
| 2013/0121760 A1 | 5/2013 | Chen et al. |
| 2013/0200234 A1 | 8/2013 | Zhao et al. |
| 2013/0247485 A1 | 9/2013 | Zimmerman et al. |
| 2013/0291479 A1 | 11/2013 | Schaefer et al. |
| 2014/0000681 A1 | 1/2014 | Zhao et al. |
| 2014/0010616 A1 | 1/2014 | Meine et al. |
| 2014/0014163 A1 | 1/2014 | McCarthy et al. |
| 2014/0026946 A1 | 1/2014 | West et al. |
| 2014/0042286 A1 | 2/2014 | Jaffari |
| 2014/0079510 A1 | 3/2014 | Suzuki et al. |
| 2014/0102517 A1 | 4/2014 | Meine et al. |
| 2014/0154908 A1 | 6/2014 | Magno et al. |
| 2014/0165499 A1 | 6/2014 | Vanker |
| 2014/0220834 A1 | 8/2014 | Rizzo |
| 2014/0353435 A1 | 12/2014 | Liu et al. |
| 2015/0101997 A1 | 4/2015 | Liu et al. |
| 2015/0102194 A1 | 4/2015 | Liu |
| 2015/0180404 A1 | 6/2015 | Braunstein et al. |
| 2015/0226246 A1 | 8/2015 | Kirchner |
| 2015/0311606 A1 | 10/2015 | Meine et al. |
| 2015/0316086 A1 | 11/2015 | Urban et al. |
| 2015/0357773 A1 | 12/2015 | Schirmeier |
| 2015/0381106 A1 | 12/2015 | Fujikawa et al. |
| 2016/0006390 A1 | 1/2016 | Cinnamon et al. |
| 2016/0043687 A1 | 2/2016 | McPheeters et al. |
| 2016/0069592 A1 | 3/2016 | Giraudo et al. |
| 2016/0087576 A1 | 3/2016 | Johansen et al. |
| 2016/0111996 A1 | 4/2016 | Stephan et al. |
| 2016/0156169 A1 | 6/2016 | Jaena |
| 2016/0282018 A1 | 6/2016 | Ash et al. |
| 2016/0233820 A1 | 8/2016 | Redel |
| 2016/0248367 A1 | 8/2016 | Almy et al. |
| 2016/0268958 A1 | 9/2016 | Wildes et al. |
| 2016/0285408 A1 | 9/2016 | Ash et al. |
| 2016/0329671 A1 | 11/2016 | Kokenda et al. |
| 2017/0033730 A1 | 2/2017 | Almy et al. |

(56) References Cited

U.S. PATENT DOCUMENTS

| | | | |
|---|---|---|---|
| 2017/0063301 | A1 | 3/2017 | Ash |
| 2017/0093327 | A1 | 3/2017 | Stephan et al. |
| 2017/0133977 | A1 | 5/2017 | Tripp et al. |
| 2017/0146041 | A1 | 5/2017 | Schaefer et al. |
| 2017/0170579 | A1 | 6/2017 | Martin |
| 2017/0201080 | A1 | 7/2017 | Maurer |
| 2017/0233996 | A1 | 8/2017 | Abernathy |
| 2017/0237386 | A1 | 8/2017 | Stephan et al. |
| 2017/0366131 | A1 | 12/2017 | Steams et al. |
| 2018/0062561 | A1 | 3/2018 | Kapla et al. |
| 2018/0076605 | A1 | 3/2018 | Garcia |
| 2018/0091091 | A1 | 3/2018 | Rossi |
| 2018/0094418 | A1 | 4/2018 | Winter |
| 2018/0245331 | A1 | 8/2018 | Tang |
| 2018/0316307 | A1 | 11/2018 | Martin |
| 2018/0342974 | A1 | 11/2018 | Jasmin et al. |
| 2018/0367093 | A1 | 12/2018 | Ayers et al. |
| 2019/0068110 | A1* | 2/2019 | McPheeters .......... F24S 25/634 |
| 2019/0154306 | A1 | 5/2019 | Rothschild |
| 2019/0178274 | A1 | 6/2019 | Katz |
| 2019/0211543 | A1 | 7/2019 | Abernathy |
| 2019/0264452 | A1 | 8/2019 | Cangelosi |
| 2019/0326847 | A1 | 10/2019 | Zuritis |
| 2020/0056370 | A1 | 2/2020 | Hebiishi |
| 2020/0389122 | A1 | 12/2020 | Stephan |
| 2020/0403559 | A1 | 12/2020 | Kresse |
| 2021/0058023 | A1 | 2/2021 | Bamat et al. |
| 2021/0067083 | A1 | 3/2021 | Stephan |
| 2021/0156135 | A1 | 5/2021 | Stephan et al. |
| 2021/0156413 | A1 | 5/2021 | Stephan |
| 2021/0194158 | A1 | 6/2021 | Ash et al. |
| 2021/0222421 | A1 | 7/2021 | Meine |
| 2021/0242821 | A1 | 8/2021 | MacDonald et al. |
| 2021/0285689 | A1 | 9/2021 | Affentranger, Jr. |
| 2021/0310513 | A1 | 10/2021 | Feldmann et al. |
| 2022/0077815 | A1 | 3/2022 | Wentworth et al. |
| 2022/0173692 | A1 | 6/2022 | Schuit et al. |
| 2022/0190781 | A1 | 6/2022 | Stephan |
| 2022/0216821 | A1 | 7/2022 | Harris et al. |
| 2022/0239247 | A1 | 7/2022 | Stephan |
| 2022/0263458 | A1 | 8/2022 | Stephan |
| 2022/0298776 | A1 | 9/2022 | Stephan |
| 2022/0345074 | A1 | 10/2022 | Neal et al. |
| 2022/0407449 | A1 | 12/2022 | Lepley et al. |
| 2023/0178904 | A1 | 6/2023 | Stephan et al. |
| 2023/0204972 | A1 | 6/2023 | Wu et al. |
| 2023/0228372 | A1 | 7/2023 | Stephan |
| 2024/0060598 | A1 | 2/2024 | Wogan et al. |
| 2024/0154570 | A1 | 5/2024 | Stephan et al. |

FOREIGN PATENT DOCUMENTS

| | | |
|---|---|---|
| DE | 202012012830 | 1/2014 |
| EM | 008534556-0001 | 10/2021 |
| EP | 2239783 | 10/2010 |
| EP | 8534556 | 5/2021 |
| EP | 20819161.9 | 11/2021 |
| EP | 20893136.0 | 3/2022 |
| EP | 3981029 | 4/2022 |
| EP | 20891880.5 | 5/2022 |
| EP | 4013970 | 6/2022 |
| EP | 4022765 | 7/2022 |
| EP | 4066283 | 10/2022 |
| EP | 21921576.1 | 5/2023 |
| EP | 4237637 | 9/2023 |
| HK | 62022063342.9 | 11/2022 |
| HK | 40074229 | 12/2022 |
| HK | 62023069412.2 | 3/2023 |
| HK | 40080613 | 5/2023 |
| MX | MX/f/2021/001551 | 5/2021 |
| MX | 2022/001475 A | 3/2022 |
| MX | MX/a/2022/004556 | 4/2022 |
| MX | 2022004556 A | 5/2022 |
| MX | 64445 | 6/2022 |
| WO | PCT/US2021/035874 | 6/2020 |
| WO | PCT/US2020/062151 | 11/2020 |
| WO | PCT/US2020/062406 | 11/2020 |
| WO | WO 2020/247463 | 12/2020 |
| WO | PCT/US2021/020708 | 3/2021 |
| WO | WO 2021/041408 | 3/2021 |
| WO | WO 2021/108492 | 6/2021 |
| WO | WO 2021/108696 | 6/2021 |
| WO | WO 2021/119458 | 6/2021 |
| WO | WO 2022/132135 | 6/2022 |
| WO | WO 2022/159122 | 7/2022 |
| WO | PCT/US2022/052152 | 12/2022 |
| WO | WO 2023/107563 | 6/2023 |
| WO | WO 2024/039912 | 2/2024 |
| WO | WO 2024/097416 | 5/2024 |

OTHER PUBLICATIONS

PCT Application No. PCT/US2022/052152, International Search Report and Written Opinion dated Mar. 28, 2023.
European Patent Office, Application No. 20893136.0, European Search Report dated Aug. 2, 2023, 5 pages.
European Patent Office, Application No. 20819161.9, European Search Report dated Apr. 20, 2023, 8 pages.
U.S. Appl. No. 16/889,635, Office Action mailed Mar. 17, 2023.
U.S. Appl. No. 16/889,635, Final Office Action mailed Nov. 4, 2022.
U.S. Appl. No. 16/889,635, Office Action mailed Sep. 28, 2022.
U.S. Appl. No. 17/834,774 Office Action mailed Nov. 10, 2022.
U.S. Appl. No. 17/672,567 Office Action mailed Jun. 30, 2023.
U.S. Appl. No. 17/102,749 Office Action mailed Sep. 15, 2023.
PCT Application No. PCT/US2020/035874, International Preliminary Report on Patentability dated Dec. 7, 2021.
PCT Application No. PCT/US2020/035874, International Search Report and Written Opinion dated Aug. 18, 2020.
PCT Application No. PCT/US2020/047792, International Preliminary Report on Patentability dated Mar. 1, 2022.
PCT Application No. PCT/US2020/047792, International Search Report and Written Opinion dated Nov. 9, 2020.
PCT Application No. PCT/US2020/065160, International Search Report and Written Opinion dated Apr. 20, 2021.
PCT Application No. PCT/US2020/062151, International Preliminary Report on Patentability dated May 17, 2022.
PCT Application No. PCT/US2020/062151, International Search Report and Written Opinion dated Feb. 17, 2021.
PCT Application No. PCT/US2020/062406, International Preliminary Report on Patentability dated May 17, 2022.
PCT Application No. PCT/US2021/020708, International Search Report and Written Opinion dated Jul. 21, 2021.
U.S. Appl. No. 16/889,635, Final Office Action mailed May 17, 2023.
U.S. Appl. No. 17/001,357, Office Action mailed Jun. 3, 2022.
U.S. Appl. No. 17/120,534, Office Action mailed May 26, 2021.
U.S. Appl. No. 17/118,771, Office Action mailed Feb. 12, 2024.
U.S. Appl. No. 17/118,771, Final Office Action mailed Oct. 10, 2023.
U.S. Appl. No. 17/118,771, Office Action mailed Apr. 6, 2023.
U.S. Appl. No. 17/118,771, Final Office Action mailed Nov. 7, 2022.
U.S. Appl. No. 17/118,771, Office Action mailed Aug. 11, 2022.
U.S. Appl. No. 17/155,624 Office Action mailed May 26, 2022.
U.S. Appl. No. 17/102,749 Final Office Action mailed Dec. 29, 2023.
PCT Application No. PCT/US2023/030741, International Search Report and Written Opinion dated Jan. 17, 2024.
U.S. Appl. No. 17/102,749, Office Action mailed Apr. 12, 2024.
PCT Application No. PCT/US2023/036805, International Search Report and Written Opinion dated Apr. 2, 2024.
European Patent Office, Application No. 20891880.5, European Search Report dated Mar. 14, 2024.
PCT/US2020/065160, Erich Kai Stephan, Hidden End Clamp, Dec. 15, 2020.
AU 2020336321, Erich Kai Stephan, Kit of Cross-Compatible Parts for Multiple Solar Installation Methods, Jan. 7, 2022.
EP 20857031.7, Erich Kai Stephan, Kit of Cross-Compatible Parts for Multiple Solar Installation Methods, Jan. 25, 2022.

(56) References Cited

OTHER PUBLICATIONS

MX/a/2022/001475, Erich Kai Stephan, Kit of Cross-Compatible Parts for Multiple Solar Installation Methods, Feb. 2, 2022.
U.S. Appl. No. 18/435,927, Erich Kai Stephan, Tilt Leg System for Solar Panel Arrays, filed Feb. 7, 2024.
PCT/US2024/014904, Erich Kai Stephan, Tilt Leg System for Solar Panel Arrays, Feb. 7, 2024.
U.S. Appl. No. 18/386,912, Erich Kai Stephan, Module Coupling Clamp, Nov. 3, 2023.
PCT/US2023/036805, Erich Kai Stephan, Module Coupling Clamp, Nov. 3, 2023.
PCT/US2023/030741, Ian Wogan, Roof Attachment with Integrated Sealant, Aug. 21, 2023.
U.S. Appl. No. 18/098,012, Office Action dated Jun. 20, 2024.
PCT Application No. PCT/US2024/014904, International Search Report and Written Opinion dated May 20, 2024.

\* cited by examiner

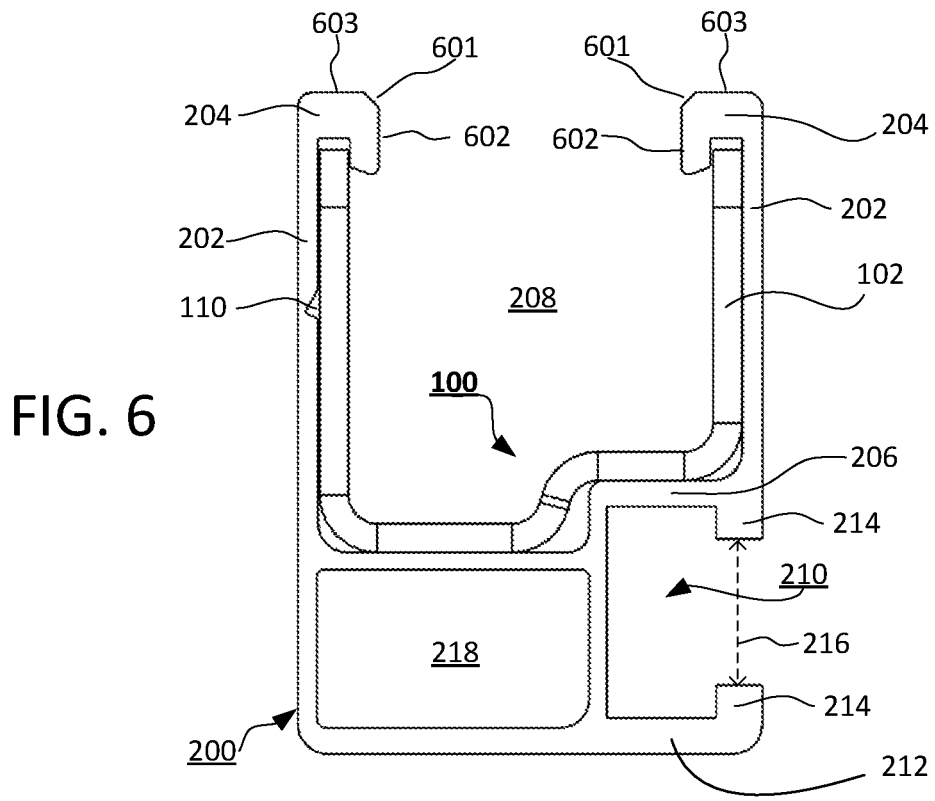
FIG. 6
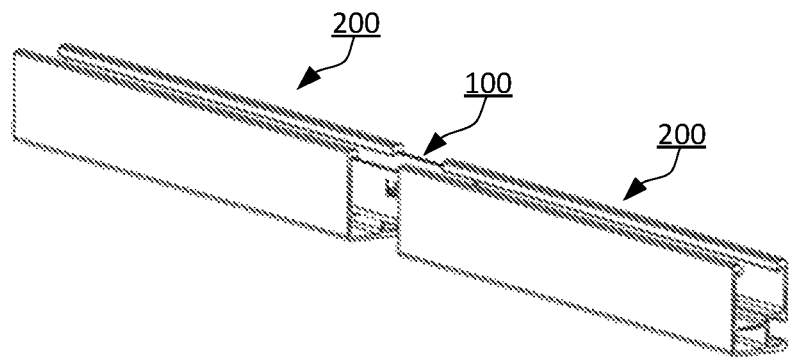
FIG. 7
FIG. 8

ONE-PIECE BONDING SPLICE FOR RAILS

CROSS-REFERENCE TO RELATED APPLICATION

This application claims the benefit of, and priority to, U.S. patent application Ser. No. 17/384,774, filed on Jun. 7, 2022, entitled "ONE-PIECE BONDING SPLICE FOR RAILS," and U.S. patent application Ser. No. 17/103,682, filed on Nov. 24, 2020, entitled "ONE-PIECE BONDING SPLICE FOR RAILS," and U.S. Provisional Patent Application No. 62/940,771, filed on Nov. 26, 2019, entitled "ONE-PIECE BONDING SPLICE FOR RAILS," the full disclosures of which are hereby expressly incorporated by reference in their entirety.

BACKGROUND

Current solar mounting solutions using rails as mounting structure use one or more splices to connect rails together. Current splice designs typically require an assembly of components to mechanically secure and electrically bond splice to a rail section and to adjoin two rail sections together.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be limiting of its scope, the principles herein are described and explained with additional specificity and detail through the use of the accompanying drawings in which:

FIG. 6 illustrates an end-view of a splice installed into a rail;

FIGS. 7-8 illustrate various steps of installation of a second rail onto a splice;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
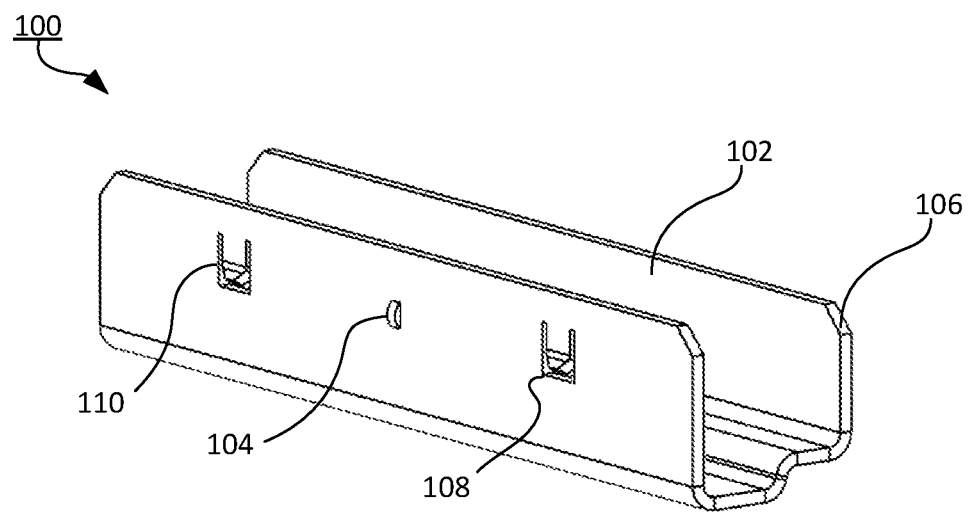
FIG. 1 illustrates isometric views of a splice.

FIG. 1 depicts an isometric view of splice 100. Splice 100 may have a main body 102. Main body 102 may define a shape for and provide structure to and support for splice 100. Main body 102 may have sidewalls defining a generally "U" shaped extruded design. In some embodiments, main body 102 may be constructed utilizing bent sheet metal. Additionally, main body 102 can be formed from a uniform material. In some embodiments, the material of main body 102 and/or other features of splice 100 may have a higher material hardness than that of a rail (e.g., rail 200 as depicted in FIG. 3).

Figure 3:
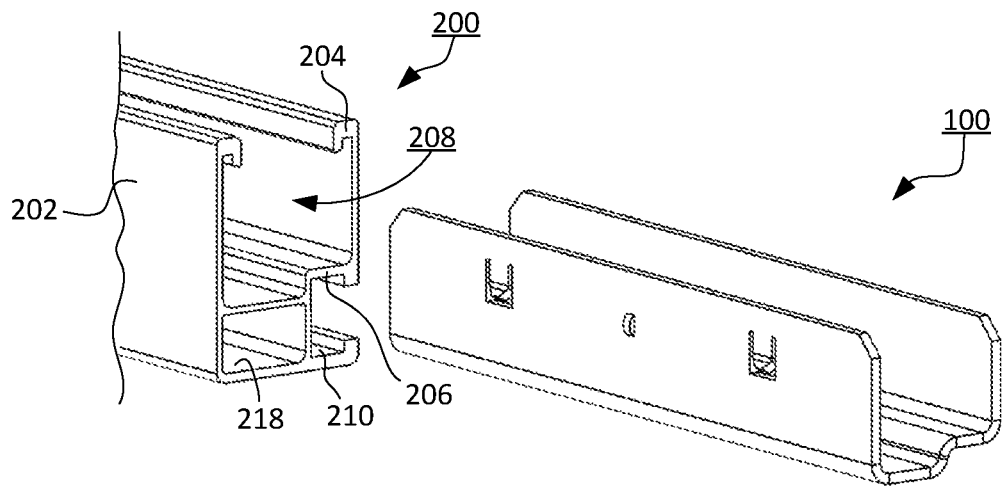
FIGS. 3-5 illustrate various steps of installation of a splice into a rail.

Moreover, main body 102 may have chamfers 106 on outer edges to provide ease of alignment and installation of splice 100 into a rail (e.g., rail 200 as depicted in FIG. 3). Furthermore, main body 102 may also have an abutment protrusion 104 and one or more spring flanges 110.

One or more abutment protrusions 104 can be positioned to protrude from one or more surfaces of main body 102. In some embodiments, abutment protrusion 104 is positioned substantially along a mid-plane of main body 102. Abutment protrusion 104 is operable to abut against an edge of rail 200 and provide a stopping point as splice 100 is installed into rail 200. Accordingly, abutment protrusion 104 can prevent splice 100 from being inserted too far into rail 200. It is to be understood, however, that abutment protrusion 104 can be positioned at any position with respect to main body 102 to control a desired installed position of splice 100 in rail 200.

One or more spring flanges 110 can protrude from an aperture 108 of main body 102. Spring flanges 110 can be generally co-planar to main body 102. In some embodiments, spring flanges 110 can extend at an angle away from a center of splice 100.

Figure 2:
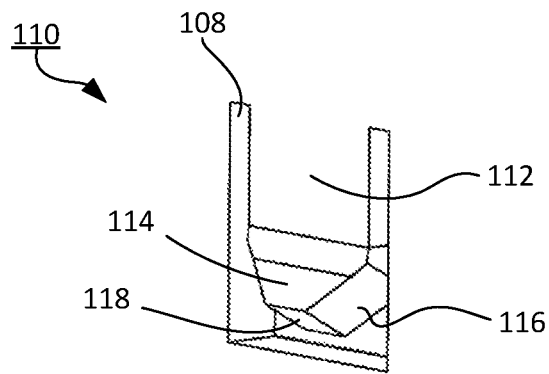
FIG. 2 illustrates a close-up isometric view of a bonding flange.

FIG. 2 depicts a close-up view of spring flanges 110. Spring flanges 110 may have a main flange body 112, a flange tab 114, chamfered tab edges 116, and a bonding edge 118.

Flange body 112 can be oriented substantially co-planar to main body 102, protrude inward into main body 102, or protrude outward of main body 102. Flange body 112 provides structural support to spring flanges 110, so that spring flanges 110 do not break off when in contact with rail 200.

Flange tab 114 may protrude and/or bend at an angle away from the outer surface of splice 100. Thus, flange tab 114 can angle outwardly away from a flange body 112 that is coincident to main body 102. Similarly, flange tab 114 can be coincident with a flange body 112 that protrudes outwardly away from main body 102. Flange tab 114 may have a stiffness or spring coefficient to prevent splice 100 from readily sliding or wiggling out of rail 200, but not so much stiffness to prevent the removal of a splice 100 from being removed from a rail 200 by an average human.

Flange tab 114 may have a bonding edge 118. Bonding edge 118 can be sufficiently dimensioned to pierce a coating on a rail (e.g., rail 200) upon splice 100 being forcibly inserted into the rail. In some embodiments, bonding edge 118 can be coined to have a smooth surface to prevent chafing with wires installed therein. Spring flange 110 may have a stiffness (e.g., via structural rigidity provided by flange body 112 and/or flange tab 114) to cause bonding edge 118 to pierce a coating of rail 200, such as anodization, paint, or powder coating, in order to cause an electrical bonding path (e.g., an electrical connection). For example, the electrical bonding path provides an electrical connection to dissipate rogue electricity (e.g., from a short, a lightning strike, etc.).

Flange tab 114 may have chamfered tab edges 116 that partially define bonding edge 118. Chamfered tab edges 116 may reduce a volume of flange tab 114 to prevent flange tab 114 from interfering with a rail that splice 100 is being installed into. Furthermore, chamfered tab edges 116 provide a smaller volume to flange tab 114 to provide an easier installation of splice 100 into a rail.

It is further contemplated that in other example embodiments not shown, flange body 112, associated orientations of flange tab 114, and bonding edge 118 may extend along a length of main body 102. In that example, spring flange 110 may act as a barb, allowing splice 100 to easily be installed into rail 200, but requiring much greater force to remove from rail 200.

Figure 4:
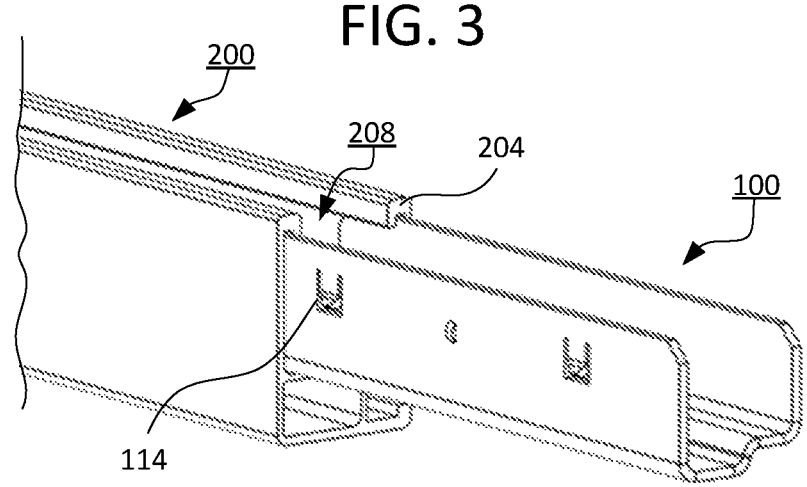
Figure 5:
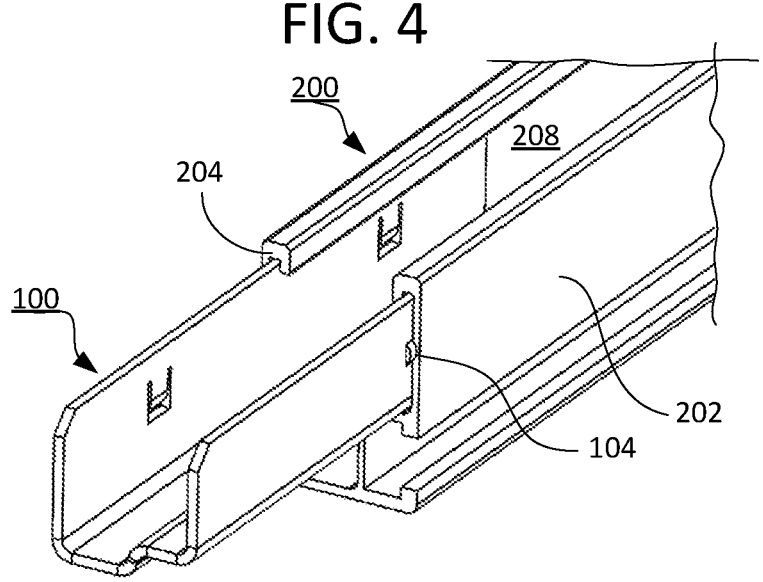

FIGS. 3-5 depict various steps of installation of splice 100 into a rail 200. More specifically, FIG. 3 depicts an isometric view of splice 100 being positioned in front of a rail 200. Rail 200 can have a rail body 202 that has guides 204, walls 206, fastener channel 210, and a structural cavity 218.

Rail body 202 provides overall structural support to rail 200. Rail body 202 may also have a generally rectangular extruded design. It is understood, however, that rail body 202 may have a wide variety of various shapes to accommodate a splice 100 installed therein. Ends of rail body 202 may have openings (e.g., an end where there is access to cavity 208, fastener channel 210, and/or structural cavity 218) to allow splice 100 to be installed therethrough.

Additionally, rail body 202 may have guides 204 that facilitate installation of splice 100 into rail 200. As shown, guides 204 may extend inward over rail body 202. In some embodiments, guides 204 may also protrude downwards into a cavity 208 of rail body 202 to provide lateral support and securement to splice 100 when splice 100 is installed therein. Furthermore, guides 204 may define a distance between a distal end of guides 204 and a sidewall of rail body 202. The distance may be operable to be substantially equal to a width of a sidewall of splice 100, such that sidewalls of main body 102 can fit into the distance, but not so loosely that there is excess lateral movement.

Walls 206 may be configured inside of rail body 202 to provide additional structural support to rail 200. Additionally, walls 206 and rail body 202 can at least partially define cavity 208. Furthermore, walls 206 and rail body 202 can be configured to define cavity 208 in any desired shape or form, such that cavity 208 can then be designed to receive splices 100 of the desired shape or form. In other words, walls 206 and rail body 202 can be used to design cavity 208 to accept and receive only splices 100 of the desired shape.

As will be discussed further below, rail 200 may also have a fastener channel 210. Fastener channel 210 is operable to receive a fastener to secure rail 200 (and splice 100 installed therein) to a mounting assembly or roof attachment bracket.

Structural cavity 218 can be defined by walls 206 and main body 202. Structural cavities can provide reduced usage of materials, while also maintaining structural support to rail 200. Furthermore, each rail 200 can have any number of structural cavities defined by walls 206 and in any shape or size as desired (e.g., FIG. 22).

FIG. 4 depicts splice 100 being partially inserted into rail 200 as a second step of the installation process. At this stage, splice 100 is partially inserted into cavity 208 of rail 200. Furthermore, flange tab 114 has not yet come into contact with rail 200 and splice 100 can continue sliding into rail 200 with minimal obstruction. Moreover, splice 100 can slide along guides 204 of rail 200 to facilitate precise installation of splice 100 into rail 200 and minimize undesired lateral or vertical movement.

FIG. 5 depicts an isometric view of splice 100 fully installed into an end of a rail 200. In this example embodiment, abutment protrusion 104 is substantially coincident with and/or abutting against an end edge of rail 200. At this step, one spring flange 110 has compressed and/or flexed towards the inward plane of splice 100, while bonding edge 118 has engaged or is in communication with an inner surface of rail body 202.

FIG. 6 is an end view of a splice 100 installed into a rail 200. In this example embodiment, the second (outer) spring flange 110 is visible, and shown to protrude at an angle away from the centerline of splice and into the dimension of rail 200. Although not shown, in some embodiments, the first (inner spring flange that is installed and abutting against an inner surface of rail 200) spring flange 110 can have a portion (e.g., flange body 112 and/or a portion of flange tab 114, see FIG. 2) protruding inwards into cavity 208.

As further shown in FIG. 6, rail body 202 and walls 206 can define cavity 208 to have a shape similar to splice 100. For example, walls 206 form a chamfer in cavity 208, such that cavity 208 can accept splices 100 that have a similar chamfer.

Additionally, guides 204 can extend over main body 102 of splice 100 and inwards into cavity 208 to reduce and/or prevent lateral movement of splice 100 as splice 100 is installed in rail 200. As depicted, a sloped surface 601 connects the distal vertical surface 602 to the top surface 603 of the guides 204. The sloped surface 601 acts as a non-sharp, or dull, transition from the top surface 603 to the distal vertical surface 602 under which the guides 204 are located.

As will be discussed in further detail below, rail body 202 can also have a fastener channel 210 defined by a bottom wall 212 and channel flanges 214.

FIG. 7 depict a second rail 200 being installed onto a second end of splice 100. After a first rail 200 is installed onto splice 100, a second rail 200 can be installed onto splice 100. In this example embodiment, a first end of splice 100 has already been installed into a first rail 200, as shown in previous figures. The second rail 200 can slide onto splice 100, while utilizing all of the above mentioned features (e.g., guides 204, walls 206, etc.).

FIG. 8 shows second rail 200 installed onto splice 100. When both first and second rails 200 are installed on splice 100, splice 100 is obscured from view.

It is further considered that splice 100 may fit through an opening to structural cavity 218. As discussed above, structural cavity 218 can have a wide variety of different shapes based on walls 206. Thus, structural cavity 218 can be operable to accommodate splice 100 based on a configuration of walls 206.

Figure 9:
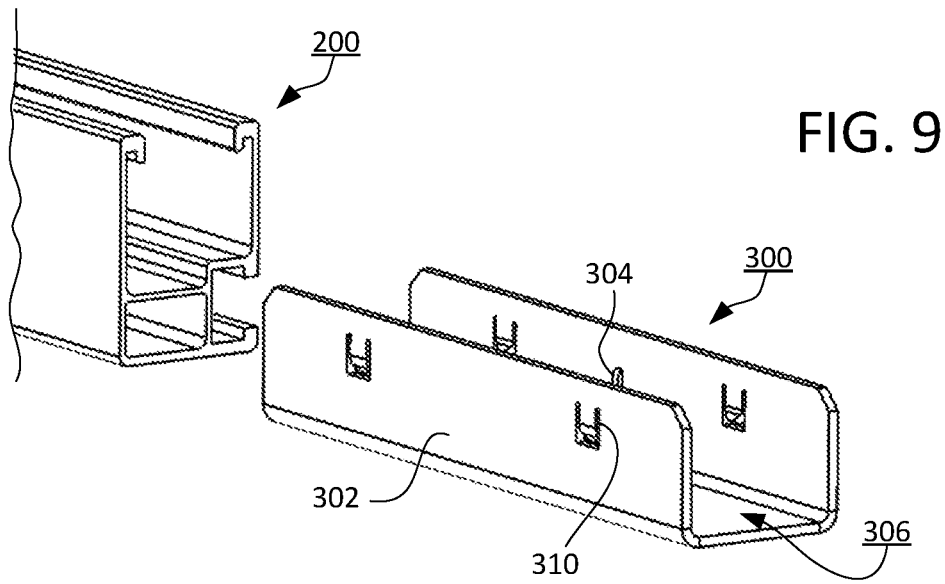
FIGS. 9-11 illustrate various steps of installation of an example external splice with one or more rails.

FIG. 9 depicts an alternative embodiment of the present invention, where an external splice 300 has a main body 302 defining a cavity 306 that is wider than rail 200. In this example embodiment, spring flanges 310 and associated features, and abutment protrusion 304 protrude inward towards the centerline of rail 200. This allows for bonding edge 118 to scrape an outer surface of rail 200 as external splice 300 is installed. In other example embodiments not shown, external splice 300 may have inward facing protrusions that align into the fastener channel 210.

Figure 10:
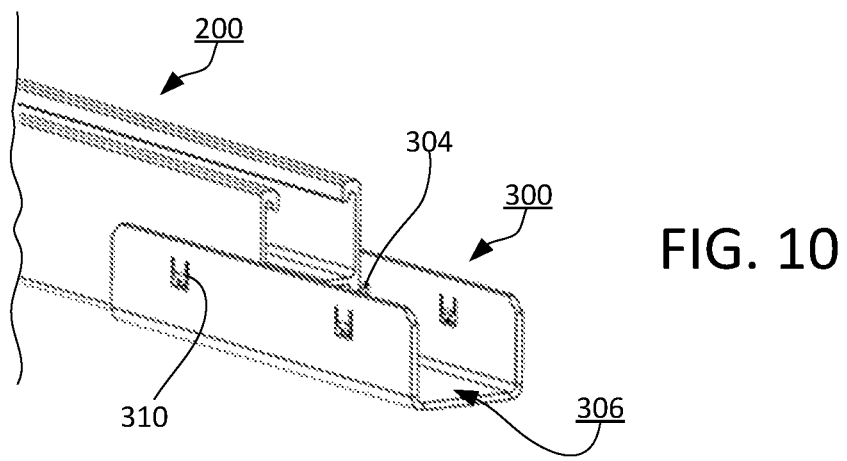

FIG. 10 depicts an external splice 300 installed onto a first rail 200 so that abutment protrusion 304 is substantially coincident with and/or abutted against an end edge of rail 200.

Figure 11:
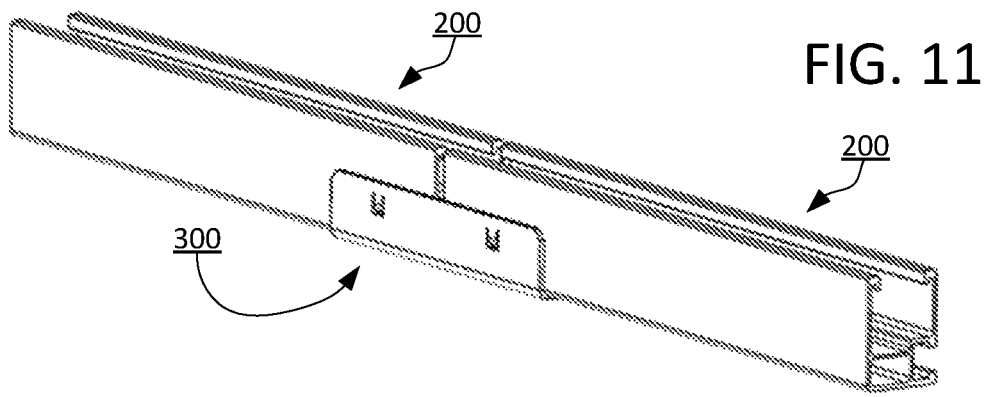

FIG. 11 depicts a second rail 200 installed onto a second end of external splice 300. In some embodiments not shown, external splice 300 may extend above the height of rail 200 and may have a horizontal flange that extends inward toward the centerline and over the top edge of rail 200.

Figure 12:
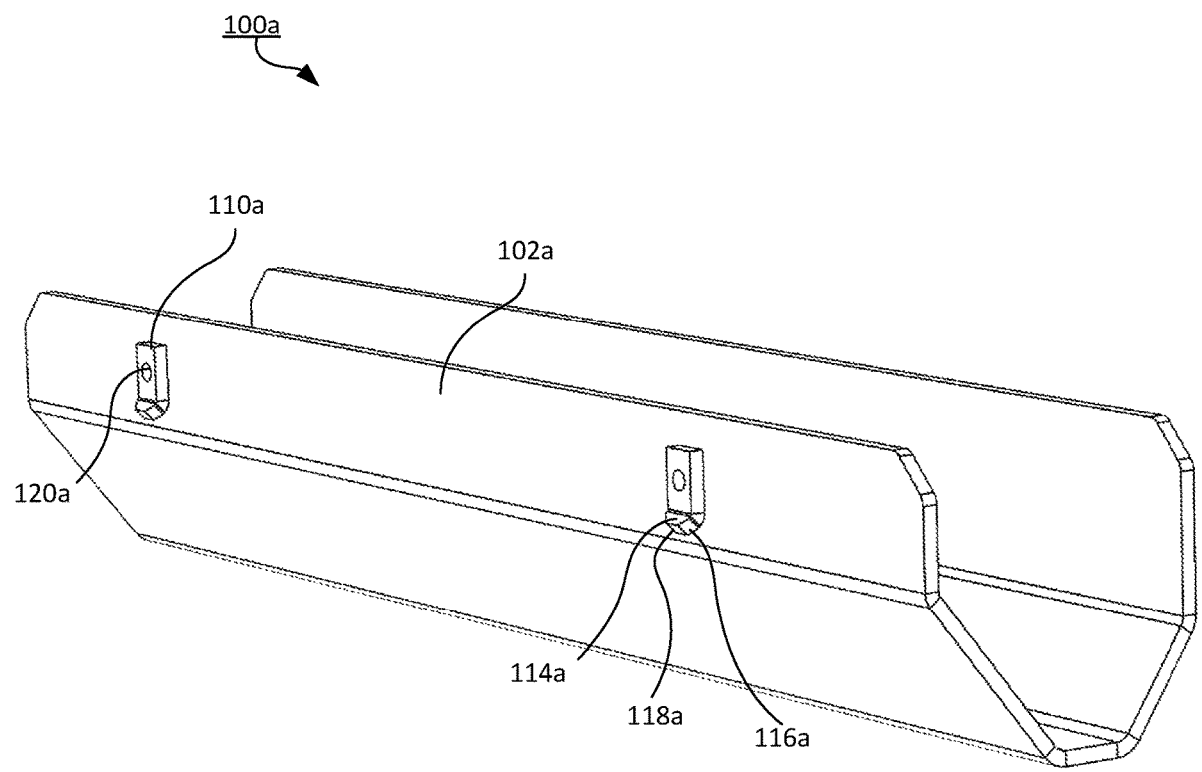
FIG. 12 illustrates an upper perspective view of another example of a splice.

FIG. 12 depicts another example splice 100a. As shown, splice 100a can have flanges 110a externally constructed on main body 102a and have features of splice 100 depicted in FIG. 1 (e.g., main body 102). Flanges 110a can be attached to main body 102a by a wide variety of different methods including, but not limited to, welding, rivets, fasteners, etc. Flanges 110a can be constructed of the same or different materials of main body 102a (e.g., metal). Additionally, flanges 110a can have various elements with similar properties as those of spring flanges 110 of splice 100 depicted in FIG. 1, such as a flange body 112a, flange tab 114a, chamfered edges 116a, and bonding edge 118a. Additionally, flanges 110a can have attachment mechanisms 120a, such as rivets, screws, bolts, to attach onto main body 102a.

Figure 13A:
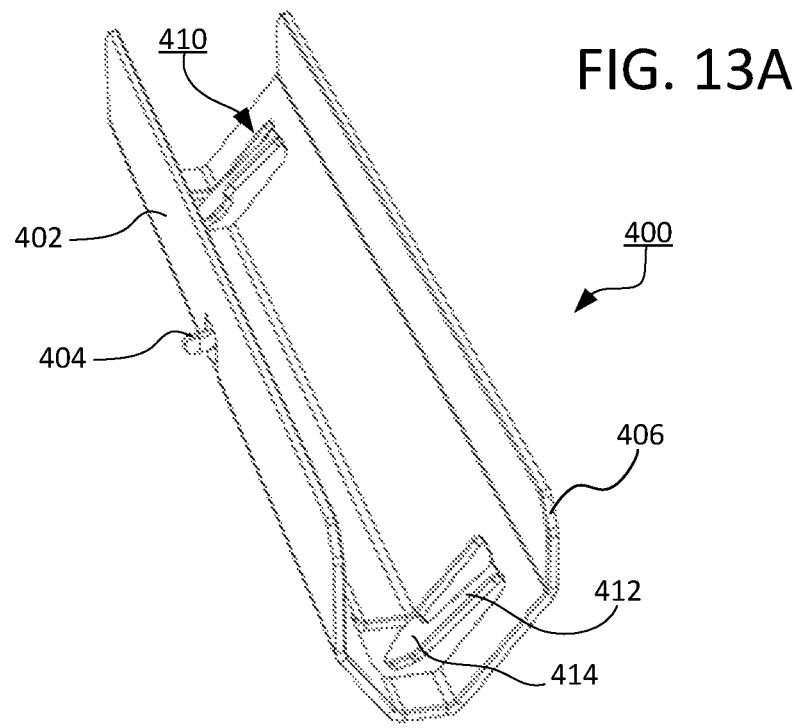
FIG. 13A illustrates an isometric view of another example of a splice.

FIG. 13A depicts another example splice 400 in an isometric view. Like splice 100 in FIG. 1, splice 400 can have a main body 402, abutment protrusions 404, chamfers 406, and spring flange 410.

Figure 16:
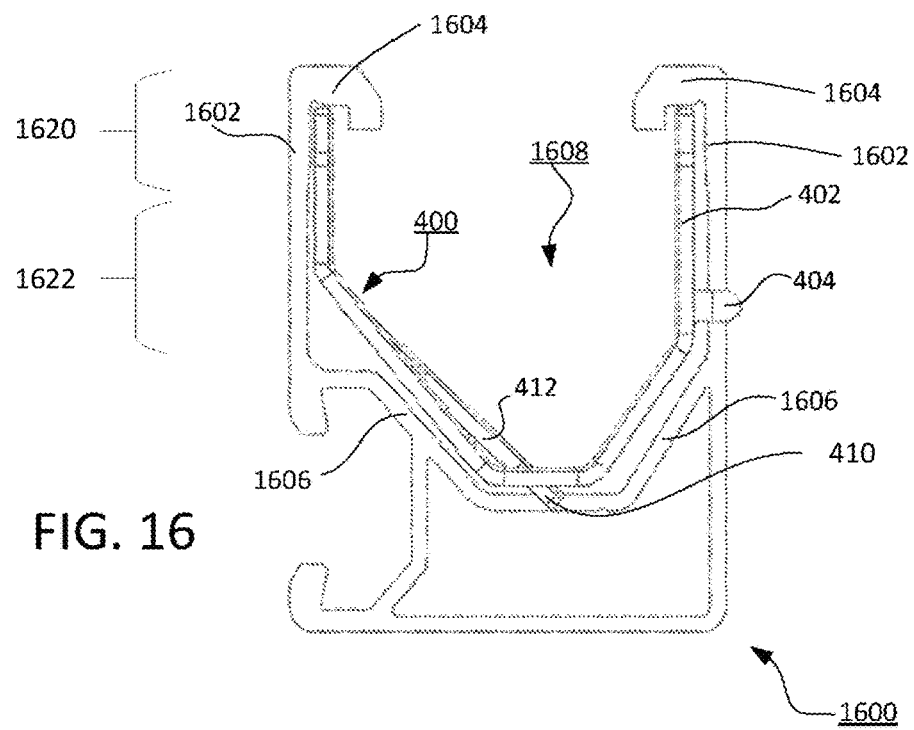
FIG. 16 illustrates an end-view of the splice of FIG. 13A installed into another example rail.

Main body 402 may define a shape for and provide structure to and support for splice 400. Main body 402 may have sidewalls defining a generally "U" shaped extruded design. Moreover, main body 402 may have chamfers 406 on outer edges to provide ease of alignment and installation of splice 400 into a rail (e.g., rail 1600 as depicted in FIG. 16). Furthermore, main body 402 may also have an abutment protrusion 404 and one or more spring flanges 410. In some embodiments, an interior surface and/or edges of main body 402 can be coined to be rounded, so that materials inside of the main body 402 (e.g., wires) will not chafe against burrs.

One or more abutment protrusions 404 can be positioned to protrude from one or more surfaces of main body 402. In some embodiments, abutment protrusion 404 is positioned substantially along a mid-plane of main body 402. Abutment protrusion 404 is operable to abut against an edge of rail 1600 (see FIG. 16) and provide a stopping point as splice 400 is installed into rail 1600. Accordingly, abutment protrusion 404 can prevent splice 400 from being inserted too far into rail 1600. It is to be understood, however, that abutment protrusion 404 can be positioned at any position with respect to main body 402 to control a desired installed position of splice 400 in rail 1600.

One or more spring flanges 410 can protrude from an aperture 408 of main body 402. Spring flanges 410 can extend at an angle inward from main body 402. In some embodiments, spring flanges 410 can be generally co-planar with a surface of main body 402 and/or extend at an angle away from a center of splice 400.

Spring flanges 410 can similarly have a flange body 412 and a flange tab 414. In some embodiments, flange body 412 may have a narrower width compared to flange tab 414. When flange body 412 is narrower than flange tab 414, flange body 412 provides additional flexibility to allow spring flange 410 to be forced inwards towards a center of splice 400 to accommodate and abut against a surface of rail 1600.

Flange tab 414 may extend substantially parallel from flange body 412. Flange tab 414 may have a stiffness or spring coefficient to prevent splice 400 from readily sliding or wiggling out of rail 1600, but not so much stiffness to prevent the removal of splice 400 from being removed from a rail 1600 by an average human.

Figure 13B:
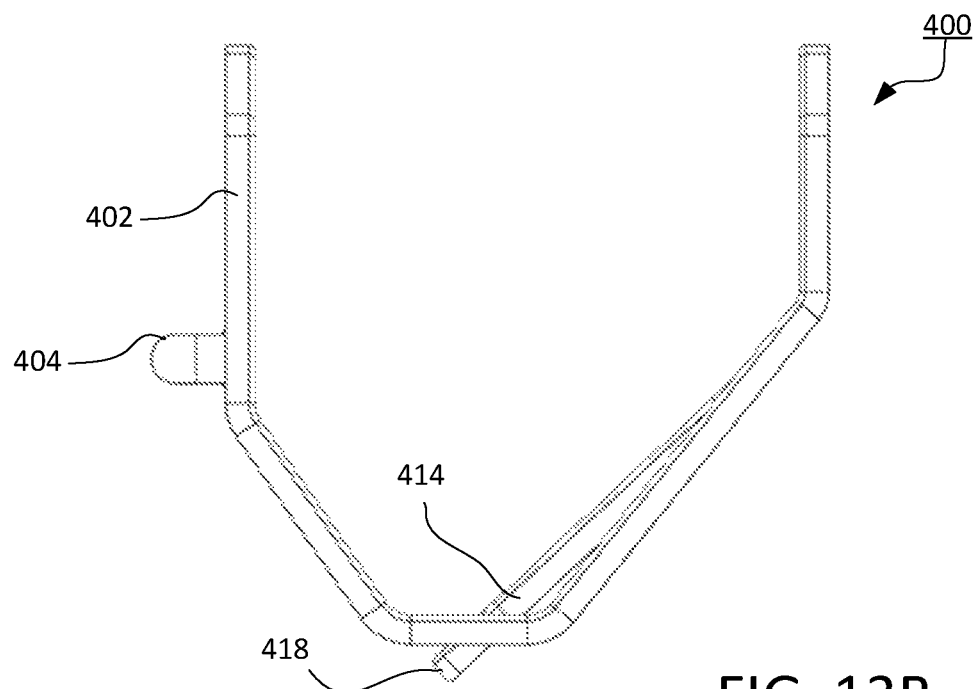
FIG. 13B illustrates an end-view of the splice of FIG. 13A.

FIG. 13B depicts an end view of splice 400. As shown, flange tab 414 may have a bonding edge 418. Bonding edge 418 can extend beyond a bottom end of main body 402. Additionally, bonding edge 418 can be sufficiently dimensioned to pierce a coating on a rail (e.g., rail 1600 in FIG. 16) upon splice 400 being forcibly inserted into the rail. Spring flange 410 may have a stiffness (e.g., via structural rigidity provided by flange body 412 and/or flange tab 414) to cause bonding edge 418 to pierce a coating of rail 1600, such as anodization, paint, or powder coating, in order to cause an electrical bonding path.

Figure 14:
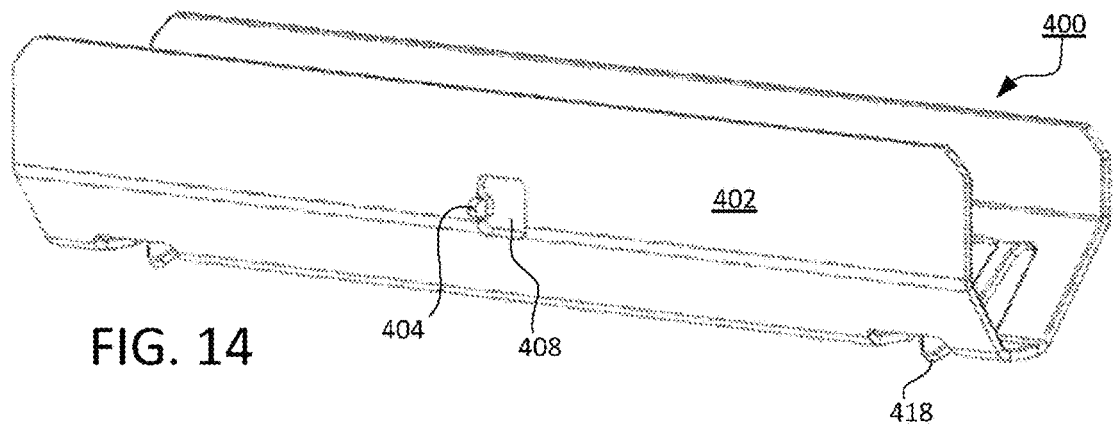
FIG. 14 illustrates an upper perspective side view of the splice of FIG. 13A.

FIG. 14 illustrates a perspective view of splice 400. As shown, main body 402 may have additional apertures 408 near abutment protrusion 404. Apertures 408 can be positioned through main body 402 to reduce a total amount of material used, while also maintaining structural integrity of main body 402.

Figure 15:
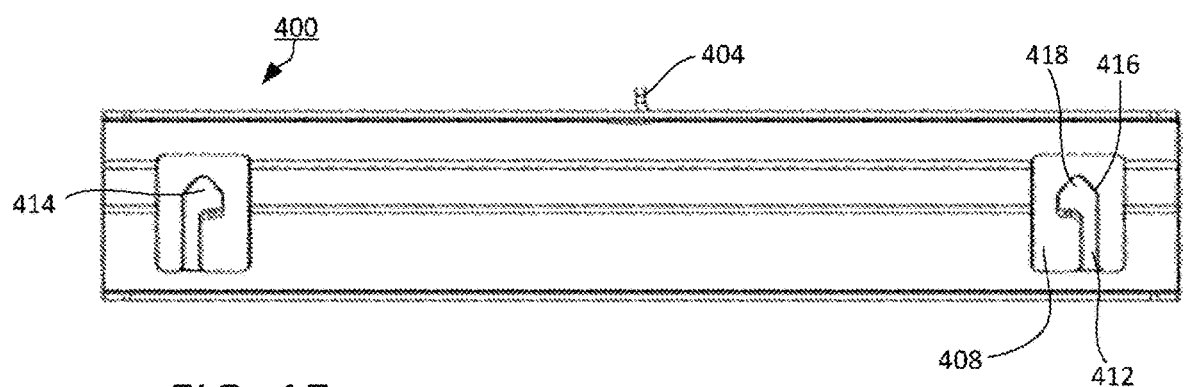
FIG. 15 illustrates a top view of the splice of FIG. 13A.

FIG. 15 illustrates a top view of splice 400. As shown, flange tab 414 may have chamfered tab edges 416 that partially define bonding edge 418. Chamfered tab edges 416 may reduce a volume of flange tab 414 to prevent flange tab 414 from interfering with a rail that splice 400 is being installed into. Furthermore, chamfered tab edges 416 provide a smaller volume to flange tab 414 to provide an easier installation of splice 400 into a rail.

FIG. 16 illustrates an end view of splice 400 installed into a rail 1600. In this example embodiment, the second (outer) spring flange 410 is visible, and shown to protrude at an angle away from the centerline of splice and into the dimension of rail 1600. Additionally, main body 402 is secured by guides 1604. As previously described, guides 1604 can extend over main body 1602 and inwards into cavity 1608 to reduce and/or prevent lateral movement of splice 400 as splice 400 is installed in rail 1600.

As further shown in FIG. 16, rail body 1602 and walls 1606 can define cavity 1608 to have a shape similar to splice 400. For example, walls 1606 form a "U" shaped lower end in cavity 1608, such that cavity 1608 can accept splices 400 that have a similar "U" shape. As depicted, the upper sections 1620 of the walls 1602 have a thickness greater than the lower sections 1622 of the walls 1602. The change in thickness may transition with a gradual, or sloped geometry, as shown. The upper sections 1620 may have the same thickness on both walls 1602, and lower sections 1622 may have the same thickness on both walls 1602 as shown. As depicted, the upper sections 1620 may extend below the guides 1604 less than half the distance of the height of walls 1602, leaving lower sections 1622 to extend the remaining majority height of the walls 1602.

Figure 17:
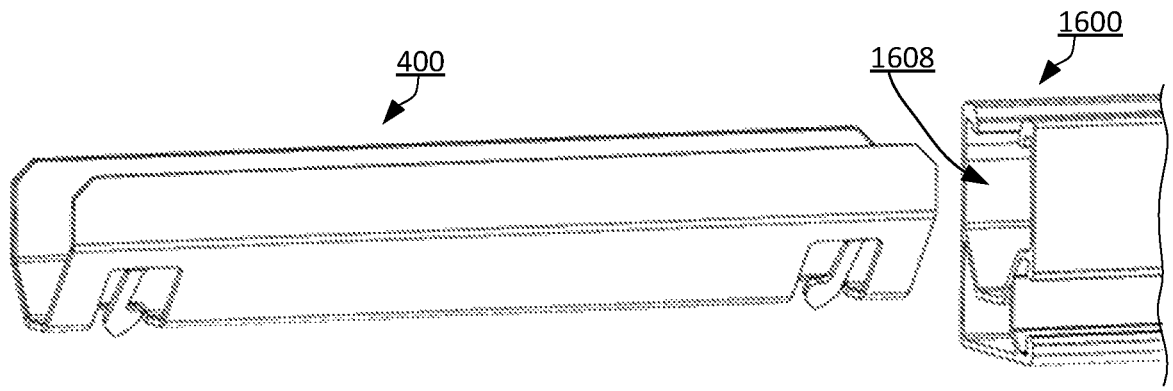
FIGS. 17-19 illustrates various steps of installation of the splice of FIG. 13A installed into the example rail of FIG. 16.
Figure 18:
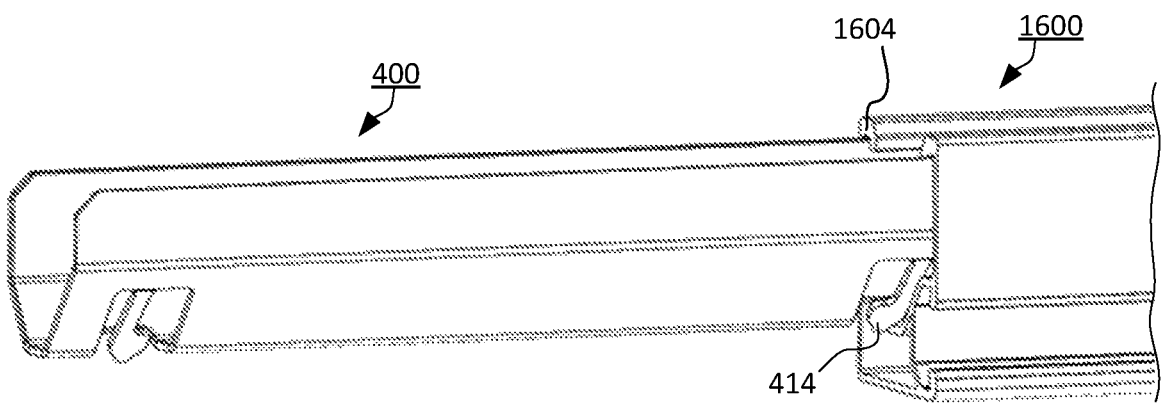
Figure 19:
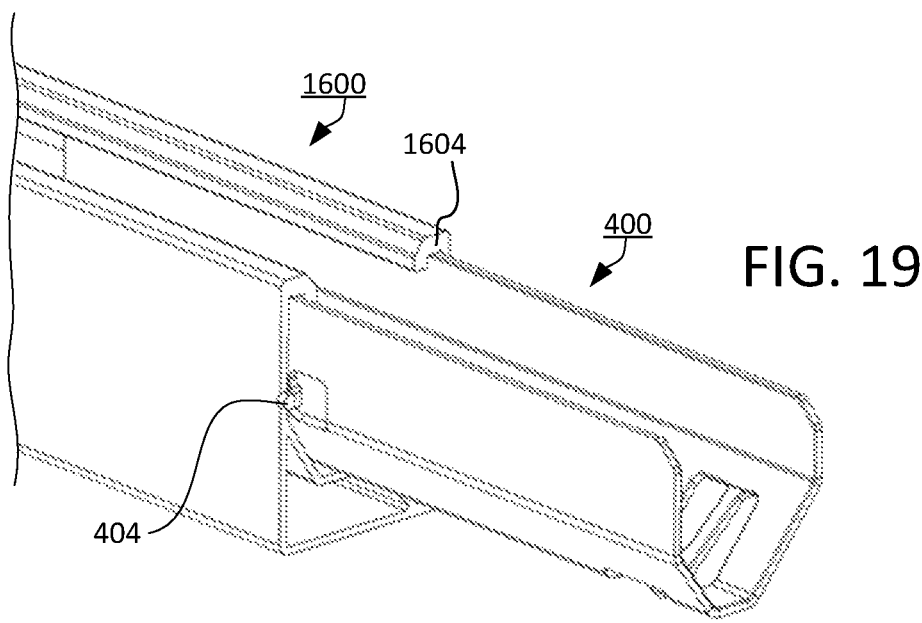

FIGS. 17-19 depict various steps for installing splice 400 into rail 1600.

More specifically, FIG. 17 depicts an isometric view of splice 400 being positioned in front of a rail 1600.

FIG. 18 depicts splice 400 being partially inserted into rail 1600 as a second step of the installation process. At this stage, splice 400 is partially inserted into cavity 1608 of rail 1600. Furthermore, flange tab 414 has come into contact with rail 1600. For splice 400 to continue sliding into rail 1600, additional force is required to cause spring flange 410 to bend. In some implementations, a user can press spring flange 410 upwards towards a center of splice 400. Splice 400 can then continue sliding into rail 1600 with minimal obstruction. Additionally, splice 400 can slide along guides 1604 of rail 1600 to facilitate precise installation of splice 400 into rail 1600 and minimize undesired lateral or vertical movement.

FIG. 19 depicts an isometric view of splice 400 fully installed into an end of a rail 1600. In this example embodiment, abutment protrusion 404 is substantially coincident with and/or abutting against an end edge of rail 1600. Although obscured from view, at this step, one spring flange 410 has compressed towards the inward plane of splice 400, while bonding edge 418 has engaged with an inner surface of rail body 1600.

In all cases, spring flanges 110, 310 or 410 may be at different heights in order to allow for a new section of the rail to be cut or scraped upon splice 100, 300 or 400 being re-installed in a different orientation into a rail 200. For example, a first end of a splice 100 may be installed into an end of a rail 200, where a first spring flange 110, 310 cuts through a coating of rail 200 at a first height. Splice 100, 300 may then be removed and spun 180 degrees so that a second end of splice 100, 300 is aligned with the same end of rail 200. Upon installation of the second end of splice 100, 300 into rail 200, the second spring flange 110, 310 will cut through the coating of rail 200 at a different height.

Splice 100, 300 or 400 may be made of an aluminum with a higher hardness value than aluminum used in rail 200 or 1600 to cause bonding edge 118 to pierce an anodization layer. Splice 100, 300 or 400 may be also be a wide variety of other materials, including but not limited to stainless steel, aluminum, etc. In other example embodiments, bonding flange may be a stainless steel pin press-fit into the side wall of splice 100, 300 or 400. Splice 100 may transfer an adequate moment force from a first rail 200 to a second rail 200 to meet a desired load condition. Splice 100 or external splice 300 may have a substantially similar mechanical properties to transfer a moment across to rail sections, or it may have lower mechanical properties that rail 200.

Figure 20:
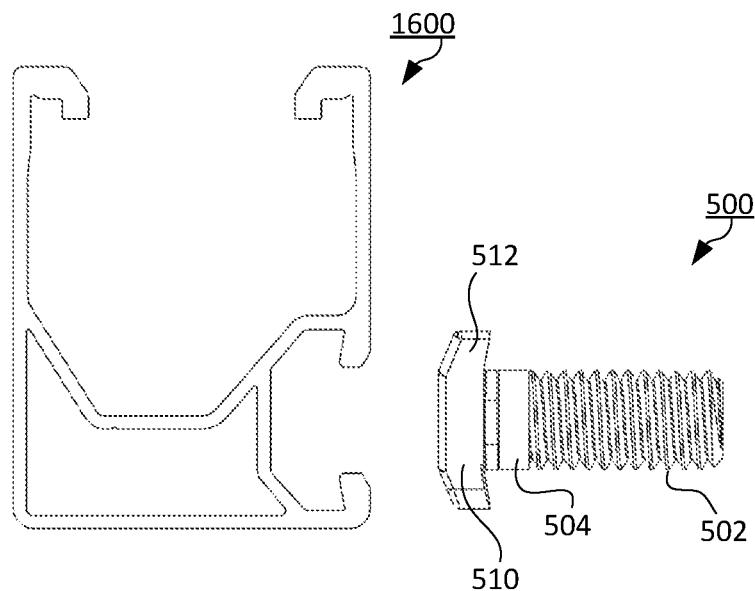
FIG. 20 illustrates a fastener for the rail of FIG. 16.

FIG. 20 illustrates an end view of a rail 1600 and a fastener 500. Fastener 500 can have a threaded length 502, a shank 504, and a head 510.

Threaded length 502 is operable to receive objects, such as a mounting assembly or plate. Threaded length 502 can then secure the objects by receiving a female threaded object, such as a nut.

Shank 504 provide structural stability to fastener 500. Shank 504 may be of a similar width or diameter as threaded length 502.

In some embodiments, fastener 500 may be a T-shaped screw, such that head 510 defines a general T-shape for fastener 500. More specifically, head 510 may have a concave face that is defined by distal ends 512 of head 510 angling towards shank 504 and thread length 502. It is further considered that both a top face (e.g., surface away from shank 504) and a bottom face (e.g., surface nearest to shank 504) may be similarly angled. In other words, the top face may also have distal ends angled down towards shank 504. In some embodiments, distal ends 512 may also be tapered, such that distal ends 512 are thinner than a main portion of head 510.

Figure 21:
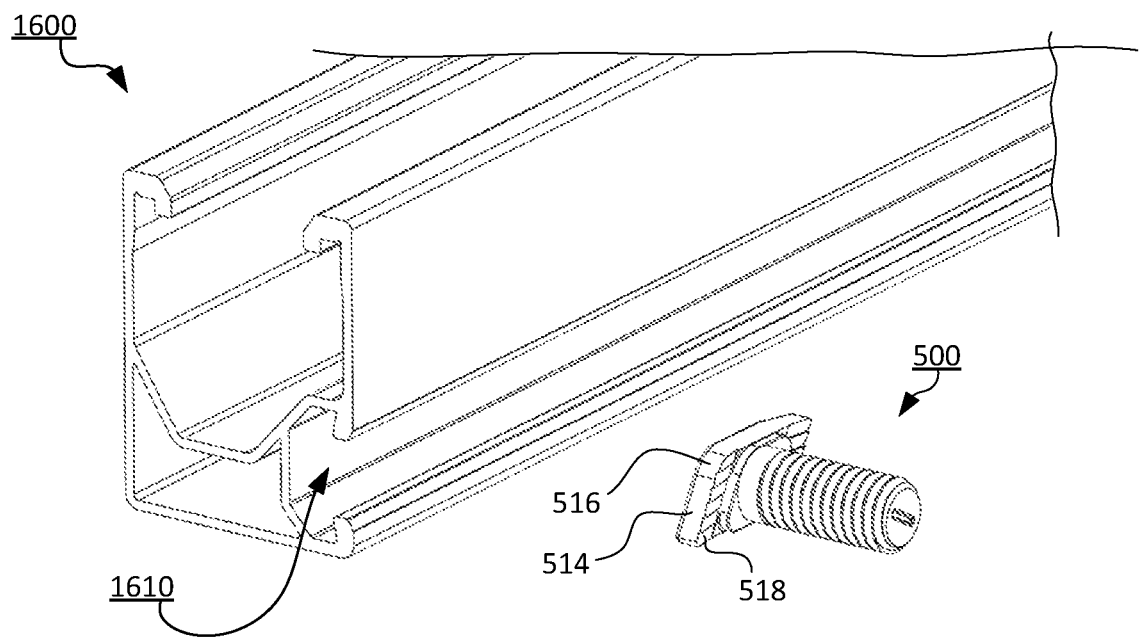
FIG. 21 illustrates a perspective view of the fastener and the rail.

FIG. 21 illustrates a perspective view of rail 1600 and fastener 500. Head 510 of fastener 500 may have angled edges 514, chamfered corners 516, and ridges 518.

Angled edges 514 provide an elongated length to head 510, so that head 510 can fill a substantial portion of fastener channel 1610 when head 510 is turned to have the length vertical with respect to fastener channel 1610. Additionally, angled edges 514 facilitate angular rotation about an axis defined by threaded length 502. Similarly, chamfered corners 516 facilitate rotation of head 510 about the axis defined by threaded length 502. Ridges 518 are operable to prevent excess rotation of head 510 when head 510 is installed in fastener channel 1610.

FIGS. 22-25 illustrate various steps for installing fastener 500 into rail 1600.

Figure 22:
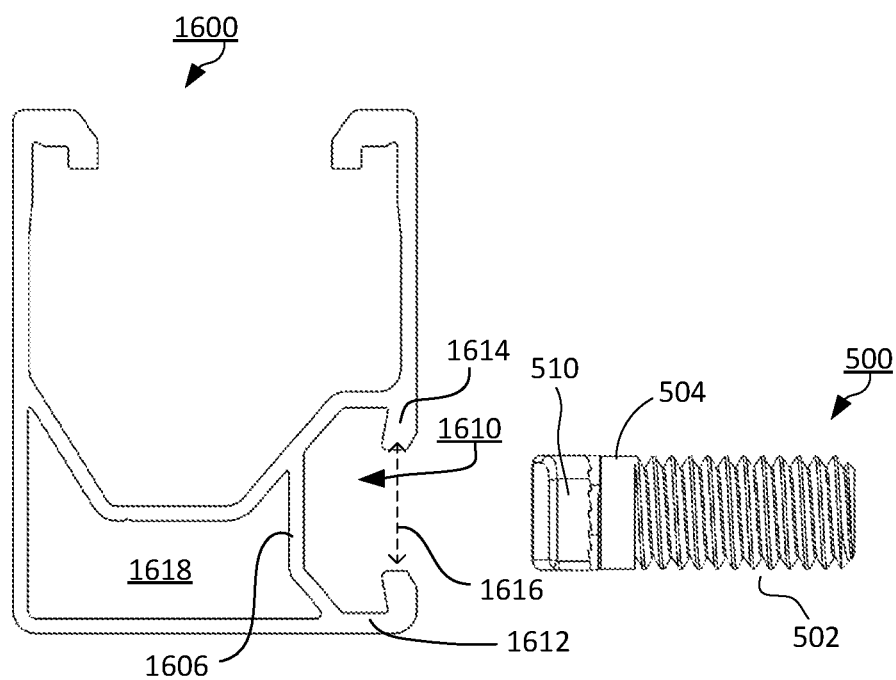
FIGS. 22-26 illustrate various steps of installation of the fastener into the rail.

FIG. 22 illustrates fastener 500 oriented in front of the rail 1600, with the length of the fastener 500 substantially parallel with an opening 1616 of fastener channel 1610. More specifically, opening 1616 can be defined by bottom wall 1612 and channel flanges 1614. Bottom wall 1612 may similarly have a channel flange 1614 that extends upwards therefrom. Channel flanges 1614 can extend inwards around fastener channel 1610 to define opening 1616. In some embodiments, channel flanges 1614 may also extend inwards towards a center of rail 1600, such that distal ends of channel flanges 1614 are further inwards than portions of rail body 1602 that they extend from.

Figure 23:
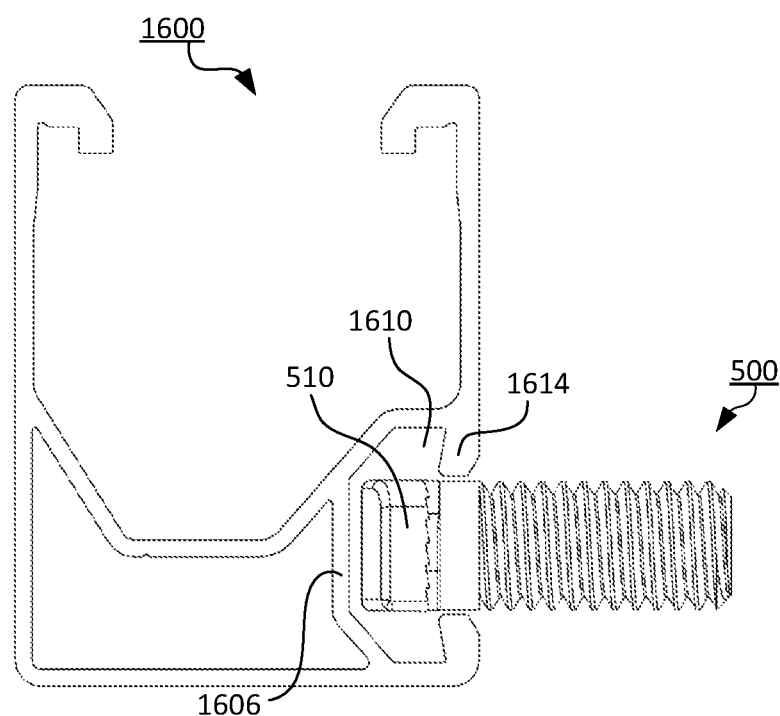

In FIG. 23, head 510 has passed through opening 1616 of fastener channel 1610, with the head 510 fully into fastener channel 1610.

Figure 24:
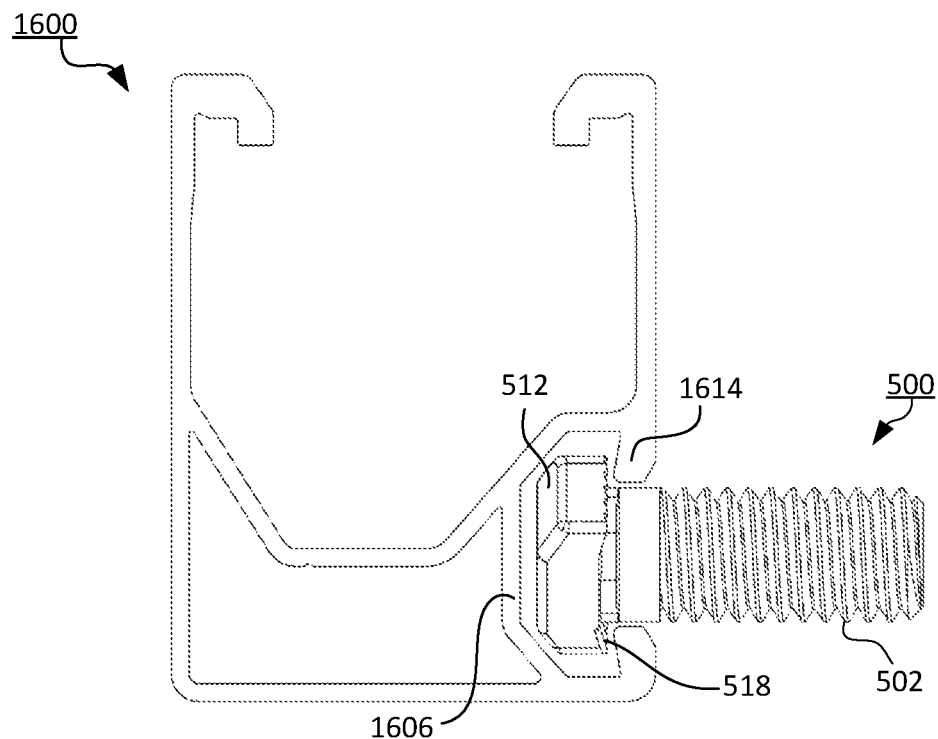

FIG. 24 depicts fastener 500 partially turned along the axis defined along threaded length 502. Here, head 510 is angled to avoid interference with the wall 1606. As shown, wall 1606 may have a general "C" shape similar to head 510. Likewise, the "C" shape of wall 1606 has space to allow for a thicker central portion of the head 510 to fit inside fastener channel 1610 and slanted areas to accommodate angled distal ends 512. Furthermore, ridges 518 can interfere with channel flanges 1614 to prevent undesired rotation of fastener 500.

Figure 25:
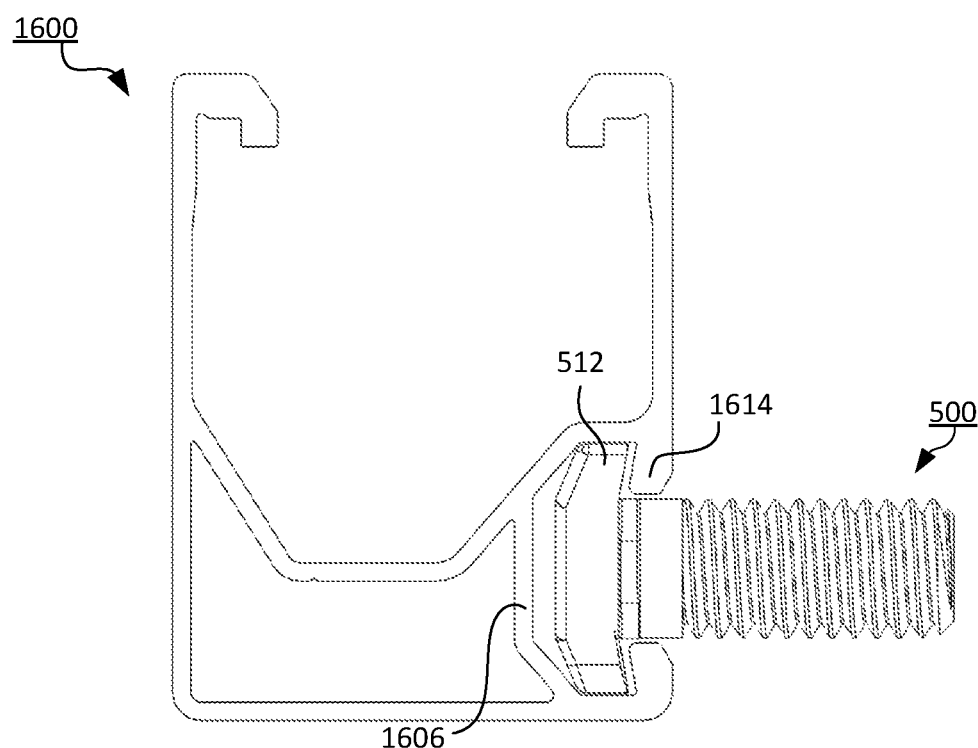

FIG. 25 depicts fastener 500 turned so that distal ends 512 of the head 510 are substantially coincident with walls 1606 and channel flanges 1614 of the fastener channel 1610. In this position, head 510 is of a substantially similar shape as fastener channel 1610. More specifically, head 510 has a substantially similar shape as a shape defined by walls 1606 and channel flanges 1614. Thus, distal ends 512 are substantially parallel with the some walls 1606 and channel flanges 1614. Furthermore, in some embodiments, walls 1606 can curve or have angles that cause a curvature greater than a thickness of head 510. For example, wall 1606 forms a concave wall that curves towards fastener channel 1610 at a sharper angle than the angle of distal ends 512 to head 510. Thus, the defined fastener channel 1610 may be operable to only accept specific fastener heads (e.g., head 510).

Figure 26:
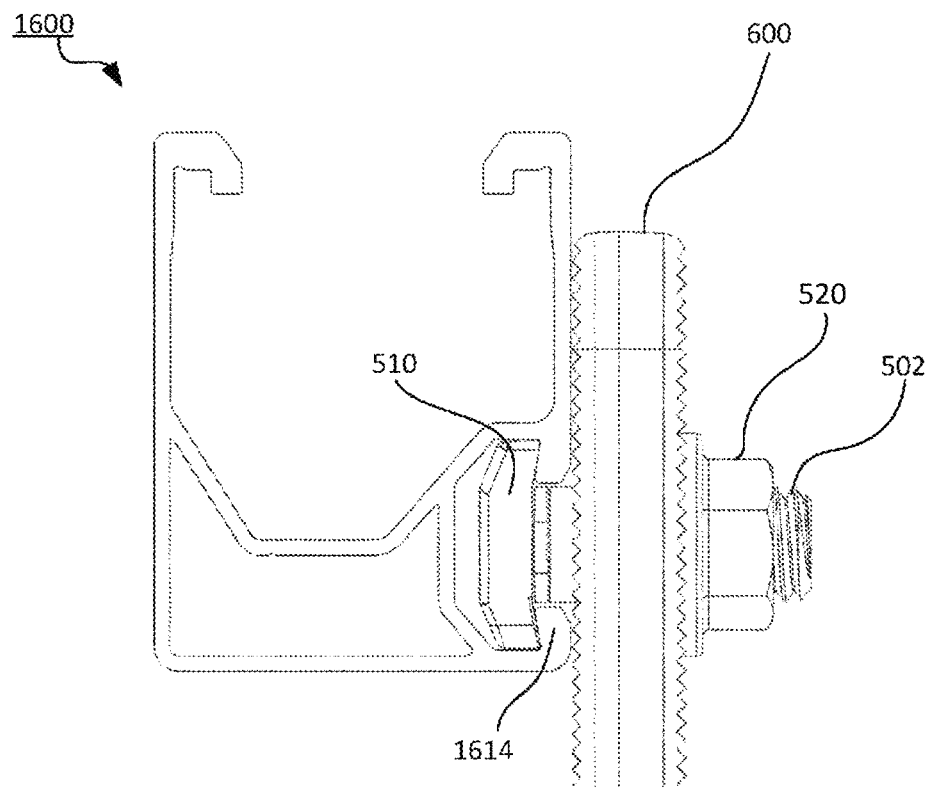

FIG. 26 depicts an end view of the rail 1600, fastener 500, mount (or roof attachment bracket) 600, and nut 520. Nut 520 is threadably engaged with threaded length 502 to compress the rail 1600 to mount 600. Head 510 interfaces with channel flanges 1614 as nut 520 is threadably engaged onto threaded length 502.

Figure 27:
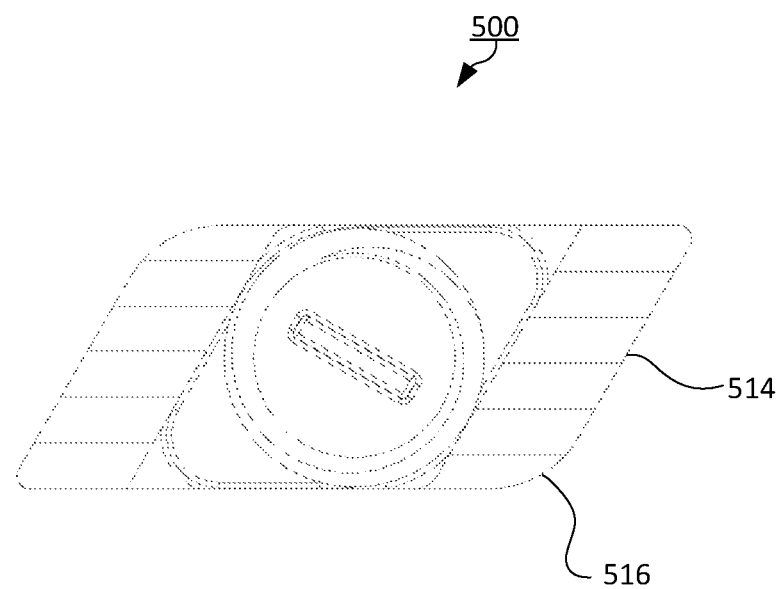
FIG. 27 illustrates a bottom view of the fastener.

FIG. 27 depicts a bottom view of fastener 500. FIG. 27 provides a better view of angled edges 514 and chamfered corners 516. As discussed above, angled edges 514 provide an elongated length to head 510, so that head 510 can fill a substantial portion of fastener channel 1610 when head 510 is turned to have the length vertical with respect to fastener channel 1610. Additionally, angled edges 514 facilitate angular rotation about an axis defined by threaded length 502. Similarly, chamfered corners 516 facilitate rotation of head 510 about the axis defined by threaded length 502. Ridges 518 are operable to prevent excess rotation of head 510 when head 510 is installed in fastener channel 1610.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method for connecting rails of a solar panel mount assembly, the method comprising:
    aligning first and second edges at a first end of a u-shaped splice with first and second inwardly protruding guides of a first u-shaped rail;
    inserting the splice into the first u-shaped rail until the splice is partially installed within the first u-shaped rail;
    aligning first and second edges at a second end of the splice with first and second inwardly protruding guides of a second u-shaped rail;
    inserting the splice into the second u-shaped rail in cooperation with the first and second inwardly protruding guides, wherein the first and the second inwardly protruding guides prevent lateral movement of the u-shaped splice as the u-shaped splice is inserted into the second u-shaped rail; and
    securing one of the first u-shaped rail and the second u-shaped rail to a roof attachment bracket.

2. The method of claim 1, wherein inserting the u-shaped splice into the second u-shaped rail forms an electrical bond path between the first u-shaped rail and the second u-shaped rail.

3. The method of claim 1, wherein inserting the u-shaped splice into the second u-shaped rail causes a moment capacity of the first u-shaped rail to become similar to a moment capacity of the u-shaped splice.

4. The method of claim 1, wherein an external wall of the u-shaped splice substantially coincides with an internal wall of the first u-shaped rail when the u-shaped splice is inserted into the first u-shaped rail.

5. The method of claim 1, wherein the first u-shaped rail further includes a plurality of wall sections, and wherein a first wall section adjacent to the first guide has a greater thickness than another wall section.

6. The method of claim 1, wherein one of the first or the second inwardly protruding guides extends into a u-shaped cavity of a cross-sectional shape of the first u-shaped rail.

7. A solar panel mount assembly comprising:
    a first rail having a first moment capacity, the first rail including:
        a first cross-sectional shape having a substantially u-shaped cavity, wherein the first cross-sectional shape is uniform along an entire length of the first rail,
        a first inwardly protruding guide, and
        a second inwardly protruding guide; and
    a u-shaped splice having a second moment capacity and configured to fit within the first rail, the u-shaped splice including:
        a first edge configured to slide along the first inwardly protruding guide of the first rail, wherein the first inwardly protruding guide is configured to prevent lateral movement when the u-shaped splice is fitted into the first rail; and
        a second edge configured to slide along the second inwardly protruding guide of the first rail, wherein the second inwardly protruding guide is also configured to prevent lateral movement when the u-shaped splice is fitted into the first rail.

8. The solar panel mount assembly of claim 7, wherein the first rail further includes a plurality of wall sections, and wherein a first wall section adjacent to the first inwardly protruding guide has a greater thickness than another wall section.

9. The solar panel mount assembly of claim 7, wherein the first moment capacity and the second moment capacity are similar.

10. The solar panel mount assembly of claim 7, wherein the u-shaped splice provides an electrical bonding path when the u-shaped splice is installed in the first rail and a second rail.

11. The solar panel mount assembly of claim 7, wherein an external wall of the u-shaped splice substantially coincides with an internal wall of the first rail when the u-shaped splice is inserted into the first rail.

12. The solar panel mount assembly of claim 7, wherein the u-shaped splice has a substantially uniform wall thickness.

13. The solar panel mount assembly of claim 7, wherein the first inwardly protruding guide or the second inwardly protruding guide extends into the u-shaped cavity of the cross-sectional shape of the first rail.

14. A solar panel mount assembly comprising:
    a first aluminum rail having a first moment capacity and a substantially u-shaped first cross-section, the first aluminum rail including:
        a first guide extending inwardly from a first side wall of the substantially u-shaped first cross-section, the first guide having:
            a first surface;
            a second surface that is substantially orthogonal to the first side wall of the aluminum rail; and
            a sloped transition surface between the first surface and the second surface; and
        a second guide extending inwardly from a second side wall of the substantially u-shaped first cross-section; and
    a splice having a second moment capacity and a substantially u-shaped second cross-section that fits into the substantially u-shaped first cross-section of the first aluminum rail, the splice including:
        a first edge that cooperates with the first guide of the first aluminum rail, wherein the first guide is configured to prevent lateral movement of the splice as the splice is fitted into the first aluminum rail; and
        a second edge that cooperates with the second guide of the first aluminum rail, wherein the second guide is also configured to prevent lateral movement of the splice as the splice is fitted into the first aluminum rail.

15. The solar panel mount assembly of claim 14, wherein the first aluminum rail further includes a plurality of wall sections, and wherein a first wall section adjacent to the first guide has a greater thickness than another wall section.

16. The solar panel mount assembly of claim 14, wherein the first moment capacity and the second moment capacity are similar.

17. The solar panel mount assembly of claim 14, wherein the u-shaped splice provides an electrical bonding path when the splice is installed in the first aluminum rail and a second aluminum rail.

18. The solar panel mount assembly of claim 14, wherein an external wall surface of the splice substantially coincides with an internal wall surface of the first aluminum rail.

19. The solar panel mount assembly of claim 14, wherein the splice is made of a material that is harder than a material of the first aluminum rail.

20. The solar panel mount assembly of claim 14, wherein the splice further includes at least one protrusion configured to pierce a coating of the first aluminum rail when the u-shaped splice is inserted into the first aluminum rail.

* * * * *